Aug. 20, 1963  C. WILLIAMS  3,100,958
LAWN MOWER
Filed July 3, 1961  3 Sheets-Sheet 1

INVENTOR.
CHESTER WILLIAMS
BY Edward M. Apple
atty

Aug. 20, 1963 C. WILLIAMS 3,100,958
LAWN MOWER
Filed July 3, 1961
3 Sheets-Sheet 2
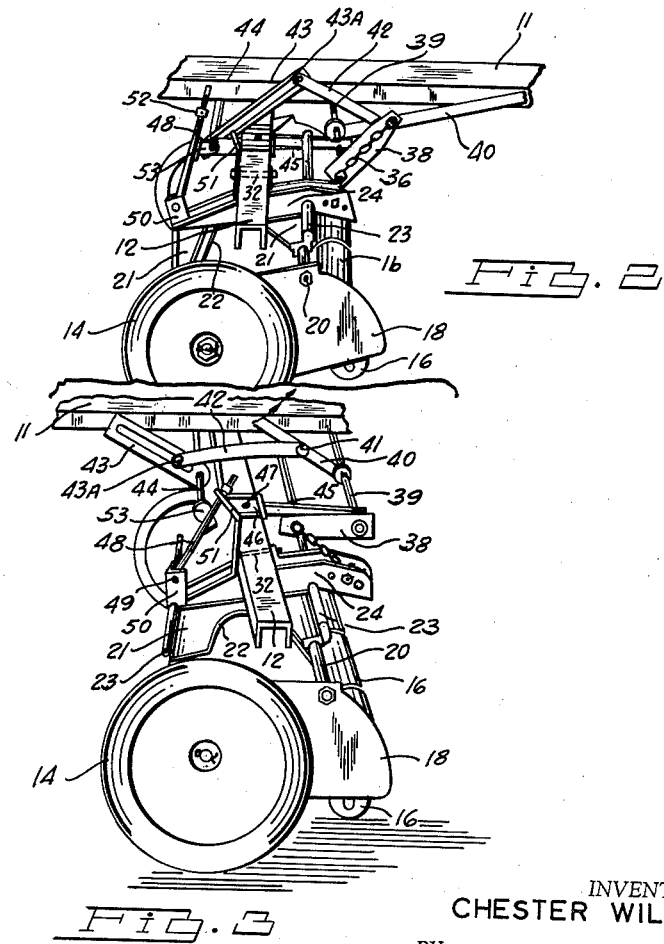
INVENTOR.
CHESTER WILLIAMS
BY Edward M. Apple
ATTORNEY Aug. 20, 1963   C. WILLIAMS   3,100,958
LAWN MOWER
Filed July 3, 1961   3 Sheets-Sheet 3
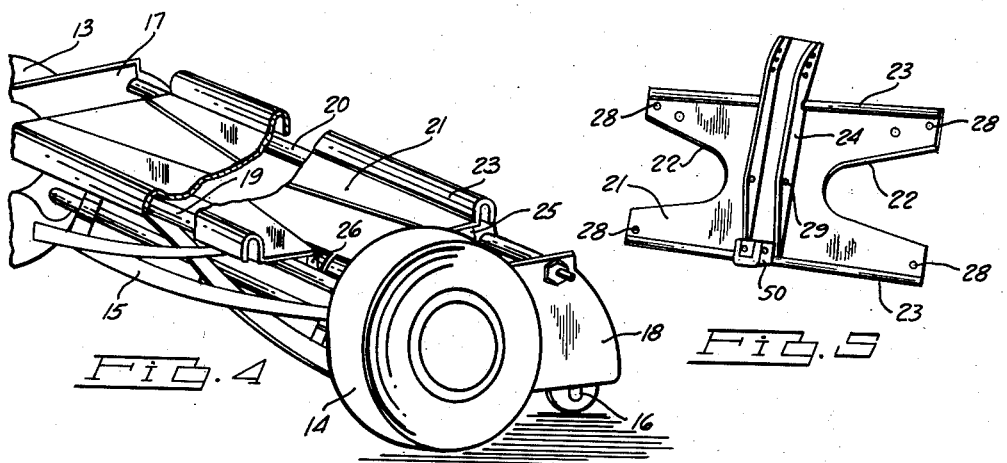
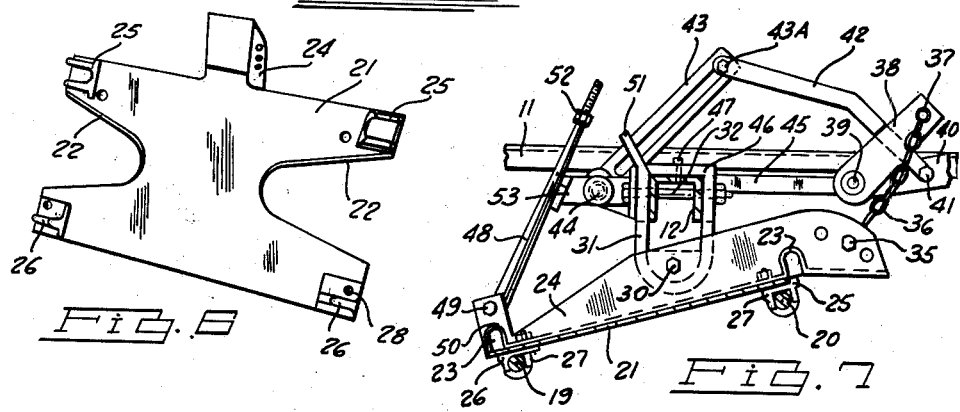
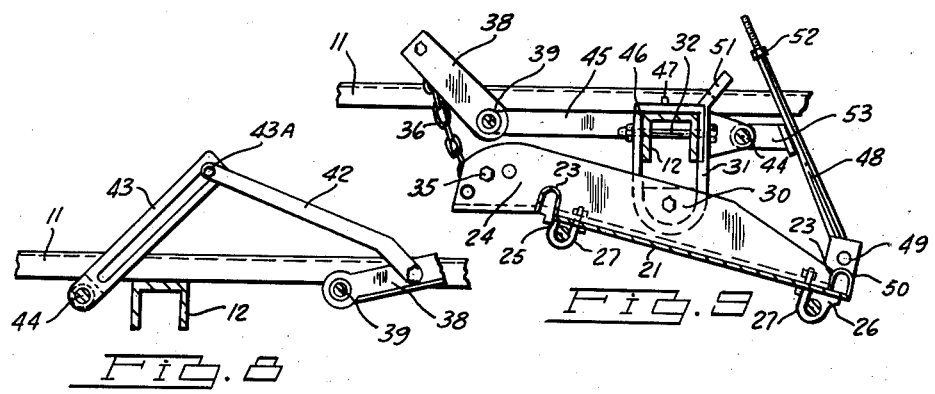
INVENTOR.
CHESTER WILLIAMS
BY Edward M. Apple
ATTORNEY

United States Patent Office 3,100,958
Patented Aug. 20, 1963

3,100,958
LAWN MOWER
Chester Williams, 5651 Carpenter Road, Ypsilanti, Mich.
Filed July 3, 1961, Ser. No. 121,497
3 Claims. (Cl. 56—7)

This invention relates to a reel type lawn mower and has particular reference to means for connecting the mower to another structure employed as the motive means for the mower.

An object of this invention is to provide novel means for attaching a reel type mower to another structure, so that the ends of the mower will have limited vertical movement with respect to said structure, and so that the mower may be rocked to a limited degree about its longitudinal axis, with means for limiting and controlling said movements.

Another object of the invention is to provide novel means, whereby a reel type mower may be quickly assembled to and disassembled from a power driven structure.

Another object of the invention is to provide a device of the character indicated, whereby reel type mowers may be attached in a manner to permit the rocking of the rollers and cutting bars of the mowers off the ground and to lock the rollers and cutting bars in elevated position, whereby the mowers may be moved over gravel roads, and the like, without any damage to the cutting bars and reels.

Another object of the invention is to provide a device of the character indicated, in which the wheels of reel type mowers are used as principal support members for the device.

Another object of the invention is to provide a device of the character indicated, in which the individual reel type mowers are mounted for endwise, as well as forward and backward pivotal action with means for locking the mowers against forward and backward movement, and means to release such locking means.

Another object of the invention is to provide a device of the character indicated, in which the reel type mowers are driven by the contact of their wheels with the ground, the mower wheels being utilized as weight supporting elements at all times.

Another object of the invention is to provide a device of the character indicated, which employs reel type mowers with novel means for attaching said mowers for gang operation.

Another object of the invention is to provide a device of the character indicated, which is simple in construction, economical to manufacture, efficient in operation, and so constructed and arranged that all of the working parts are accessible for easy repair or replacement.

The foregoing and other objects and advantages of the invention will become more apparent as the description proceeds, reference being made from time to time to the accompanying drawings, forming part of the within disclosure, in which drawings:

FIG. 2 is another perspective view of the device shown in FIG. 1, and illustrating the mower with the rollers and cutting bar lifted off the ground for transporting the mower over a gravel road, or the like.

FIG. 3 is a perspective view similar to FIG. 2, but showing the mower with the rollers and cutting bar in position for cutting the grass.

FIG. 4 is a perspective view, with parts broken away, illustrating a reel type mower, with a mounting plate positioned thereon.

FIG. 5 is a perspective view of the mounting plate shown positioned on the mower illustrated in FIG. 4.

FIG. 6 is a perspective view of the underside of the mounting plate shown in FIGS. 4 and 5.

FIG. 7 is a section taken substantially on the line 7—7 of FIG. 1, and illustrates the position of the mounting plate and lifting mechanism, when the rollers and cutting bar of the mower are in elevated position, for transportation across gravel roads, and the like.

FIG. 8 is a section taken substantially on the line 8—8 of FIG. 1, and further illustrates the position of some of the lifting mechanism illustrated in FIG. 7.

FIG. 9 is a section taken substantially on the line 9—9 of FIG. 1.

Figure 1:
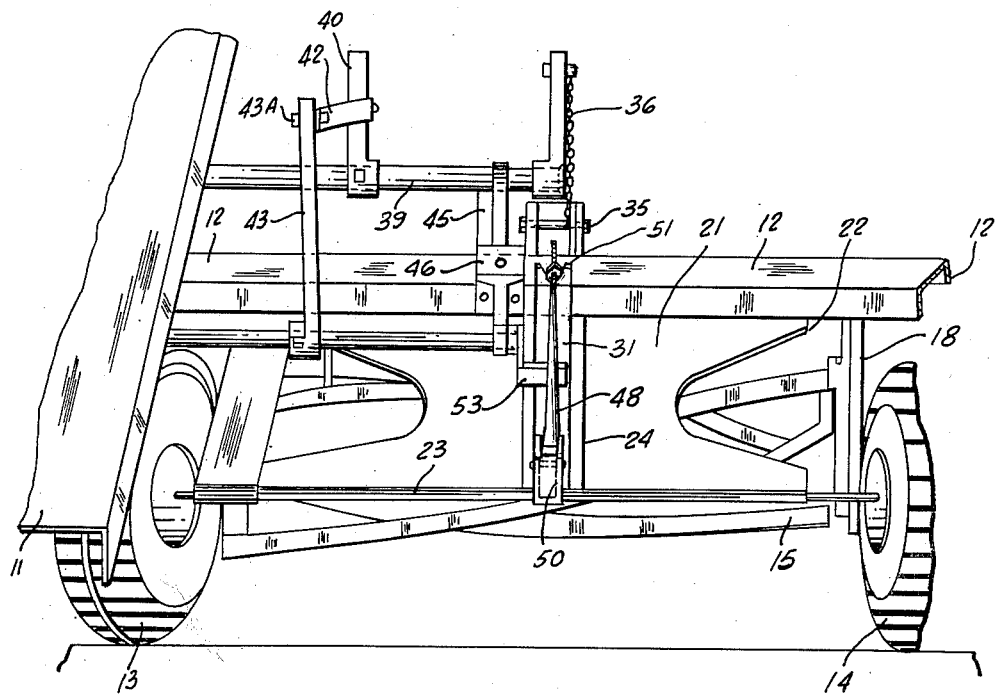
FIG. 1 is a perspective view, with parts broken away, of a device embodying the invention.

Referring now more particularly to the drawings, it will be understood that in the embodiment herein disclosed, the reference character 11 indicates the longitudinal member, and the reference character 12, indicates the transverse member of a riding power mower. It will be understood that in this application, I am disclosing but one of the reel type mowers, and the means for attaching the same, although in actual practice two or more such mowers will be employed.

I intend to disclose and claim in this application improved means for attaching and maneuvering the reels for the intents and purposes herein disclosed. In FIG. 4, I illustrate a reel type mower which I intend to secure to the elements 11 and 12 of FIG. 1. The reel shown in FIG. 4 consists of a pair of wheels 13 and 14, a cutting reel 15, rollers 16, and a conventional cutting bar (not shown), which is positioned in front of the rollers 16 and adjacent the knives of the reel 15, as in conventional practice. The reel (FIG. 4) also has a pair of end plates 17 and 18 which are tied together by means of tie rods 19 and 20, as in conventional practice. The reel 15 is driven by means of the wheels 13 and 14 through suitable gears (not shown), as in conventional practice.

In order to utilize reel type mowers in my device, I employ a plate 21 which is in the form of a casting (FIGS. 5 and 6). The plate 21 (FIG. 5) is formed with cutout portions 22 to reduce its weight and ribbed edges 23 to improve its strength. On the upper face of the plate 21 is integrally formed a channel member 24, and on the underside of the plate 21 (FIG. 6) is formed a pair of U-shaped elements 25 which are arranged to be received on top of the tie rod 20. Depending lugs 26 are also formed on the underside of the plate 21 and are positioned to receive the tie rod 19 of the mower. The members 25 and 26 hold the plate 21 in position on the mower and prevent the plate from being displaced therefrom, forwardly or reversely. The plate 21 is secured to the tie rods 19 and 20 to prevent vertical displacement therefrom, by means of J bolts 27 (FIGS. 7 and 9) which extend through apertures 28 (FIG. 5) formed in the plate 21.

The plate 21 is mounted on the tie rods 19 and 20 so that the channel shaped member 24 is positioned upwardly across the top of the plate from front to rear. The channel 24 has transverse holes 29 (FIG. 5) which are adapted to receive a bolt 30 (FIG. 7) which serves as a pivot for a U-shaped member 31, the open end of which is received about the transverse member 12, and is pivoted thereto by means of a bolt 32 which extends through suitable bores formed in the members 12 and 31. The bolt 30 permits the plate 21 and the mower, attached thereto, to rock forwardly and backwardly, and the bolt 32 permits the plate 21 and the mower, attached thereto, to rock endwise so that with this means of suspension, the mower has substantially universal action when driving over the ground. This permits the mower to move over any type of terrain.

In order to permit the roller 16 and the cutting bar of the mower to be rocked upwardly, and about the axis of the wheels 13 and 14, and while the wheels 13 and 14 remain on the ground, so that the mower may be moved over coarse gravel, or the like, I provide lifting means which I will now describe. Secured to a bolt 35 which extends through the sides of the channel 24 is a chain 36, the upper end of which is secured, as at 37, to an arm 38 (FIG. 7), which is supported for rotation with a shaft 39, which shaft 39 extends beneath the longitudinal member 11, and is journaled thereto by any suitable means, such as depending brackets (not shown). Also supported on the shaft 39 is a hand lever 40 which may be swung into reverse position as shown in FIG. 7, and which may be swung into forward position as shown in FIG. 3. Pivoted to the hand lever 40, as at 41, is a curved arm 42 which slidably connects to a slotted arm 43 by means of a bolt 43A. The arm 43 (FIG. 7) is secured for rotation with a shaft 44 which also extends beneath the member 11 and is supported thereby by suitable depending brackets (not shown). The shafts 39 and 44 are further supported at their extremities by means of a bearing support arm 45 (FIGS. 7 and 9). The bearing support arm 45 has an inverted U-shaped collar 46 which rests on top of the cross member 12 and is secured in position thereon by means of a machine screw 47 (FIGS. 7 and 9), or other suitable means.

When the hand lever 40 is swung to the rear, as shown in FIG. 7, the rear end of the plate 21 and the rollers and cutting bar of the reel are lifted approximately four inches off the ground, while the wheels 13 and 14 of the mower remain on the ground, so that the device may be transported over gravel or stoney ground without damage being done to the cutting bar and reel of the mower, and when the hand lever 40 is swung to the forward position, as shown in FIG. 3, the rear end of the plate 21 and the rollers 16 of the mower are lowered into grass cutting position.

In order to prevent the rear end of the mower from rocking upwardly during the cutting of heavy grass and the like, I provide a hold-down mechanism which I will now describe. The hold-down mechanism consists of an arm 48 (FIGS. 7 and 9) which is pivoted, as at 49, to a bracket 50 formed as part of the channel 24 of the plate 21. The upper end of the arm 48 is reduced and rounded, and is arranged to be received in a U-shaped element 51 which forms an extension of the member 31. The rounded portion of the arm 48 is threaded to receive a nut 52 which impinges against the member 51 and prevents the plate 21 from pivoting in one direction on the bolt 30. In order to release the locking arm 48, I provide a detent 53 which is mounted on the shaft 44 (FIGS. 7 and 9) and rotates therewith. The detent 53 kicks the arm 48 out of engagement with the member 51 when the hand lever 40 is moved into the rearward position, as shown in FIG. 7, and rotates out of position to permit the arm 48 to engage the member 51 when the hand lever 40 is moved into forward position, as shown in FIG. 3, in which position the rear end of the reel is held against rocking upwardly about the axis of the wheels 13 and 14, and in which position the reel is in grass cutting position.

It will be understood that, although I have only described the mounting of one reel type mower, two or more of such mowers may be mounted on the members 11 and 12 with equal facility, which additional mowers may be rocked upwardly and downwardly by the same shafts 39 and 44 and the hand lever 40 and the corresponding arms and linkage connecting thereto for the respective mowers.

It is believed that the operation of the device is obvious from the foregoing description.

Having described my invention, what I claim and desire to secure by Letters Patent is:

1. The combination with a mower, having a reel, cutting bar, wheels, rollers, spaced tie rods and means for moving said mower of a plate member having depending bosses for receiving said tie rods to prevent lateral displacement of said plate from said mower, means securing said plate to said tie rods, a channel formed on the top face of said plate, a bolt extending through the webs of said channel, a U-shaped member pivoted at one end on said bolt, and pivoted at the other end to said means for moving said mower, said channel having a rearward extension overhanging said plate, linkage connecting the rear end of said extension to a lever, which is pivoted on said means for moving said mower, said linkage and said lever being arranged to pivot said plate and channel member whereby to rock said cutting bar and said rollers upwardly about the longitudinal axis of said mower.

2. The structure defined in claim 1, in which there is a locking rod pivoted to a member in said channel at the end opposite said extension, said locking rod being received at its free end in a U-shaped bracket carried by said first named U-shaped member, adjustable means at the free end of said rod arranged to co-operate with said U-shaped bracket for locking said plate and said channel against pivotal action, and means to release said locking means.

3. The structure of claim 2, in which said last named means include a detent arranged to move the free end of said rod away from said U-shaped bracket, said detent being positioned at the end of a rod journaled for rotation on said means to move said mower, a lever on said last rod for rotating said rod, and linkage connecting said last named lever to said first named lever.

References Cited in the file of this patent
UNITED STATES PATENTS

| 2,196,892 | Berndt | Apr. 9, 1940 |
| 2,519,270 | Millar | Aug. 15, 1950 |
| 2,704,921 | Cunningham | Mar. 29, 1955 |
| 2,829,483 | Oeters | Apr. 8, 1958 |
| 2,974,463 | Lewis | Mar. 14, 1961 |

FOREIGN PATENTS

| 483,775 | Canada | June 3, 1952 |
| 854,422 | Great Britain | Nov. 16, 1960 |